Aug. 14, 1951     T. C. KANE     2,564,364
APPARATUS FOR TRIMMING SPHERICAL SEGMENTS
Filed Feb. 5, 1946     2 Sheets-Sheet 1

INVENTOR
Thomas C. Kane
by his attorneys
Stebbins, Blenko & Webb

Patented Aug. 14, 1951

2,564,364

UNITED STATES PATENT OFFICE 2,564,364

APPARATUS FOR TRIMMING SPHERICAL SEGMENTS

Thomas C. Kane, Youngstown, Ohio, assignor to The Commercial Shearing and Stamping Company, Youngstown, Ohio, a corporation of Ohio Application February 5, 1946, Serial No. 645,564

7 Claims. (Cl. 33—21)

This invention relates to apparatus of the nature of a jig for facilitating the trimming of spherical segments to the form of a quadrilateral defined by four arcs of about 70½° in length normal to each other.

Spherical containers of metal plate have numerous uses. Such containers are usually made by welding up six identical spherical segments, each being of quadrilateral form and defined by arcs about 70½° in length and normal to each other. These segments are produced by pressing square pieces of stock to the form of a spherical segment and trimming their edges to the desired final shape and dimensions. The trimming has heretofore been done by marking the finished size of the segment thereon and removing the surplus metal by a cutting torch or electric arc manipulated directly by hand. This practice is quite costly and the resulting product has relatively rough edges, the accuracy of the cut depending entirely on the skill of the workman.

I have invented apparatus of the nature of a jig for supporting the spherical segment for trimming, and having means for supporting a cutting tool and moving it along a predetermined path so as to trim the segment accurately and smoothly to finished size and shape. In a preferred embodiment, the invention comprises a pedestal adapted to support the stamping and an arm mounted for pivotal movement on an axis through the center of curvature of the segment and normal to the plane defined by one of the finished edges of the segment. Preferably four such arms are provided for trimming the four edges of the segment simultaneously. The pedestal may conveniently be mounted on a base including a frame having slide bars for guiding the arms and the pivots on which the arms move angularly may be mounted on the pedestal.

Figure 1:
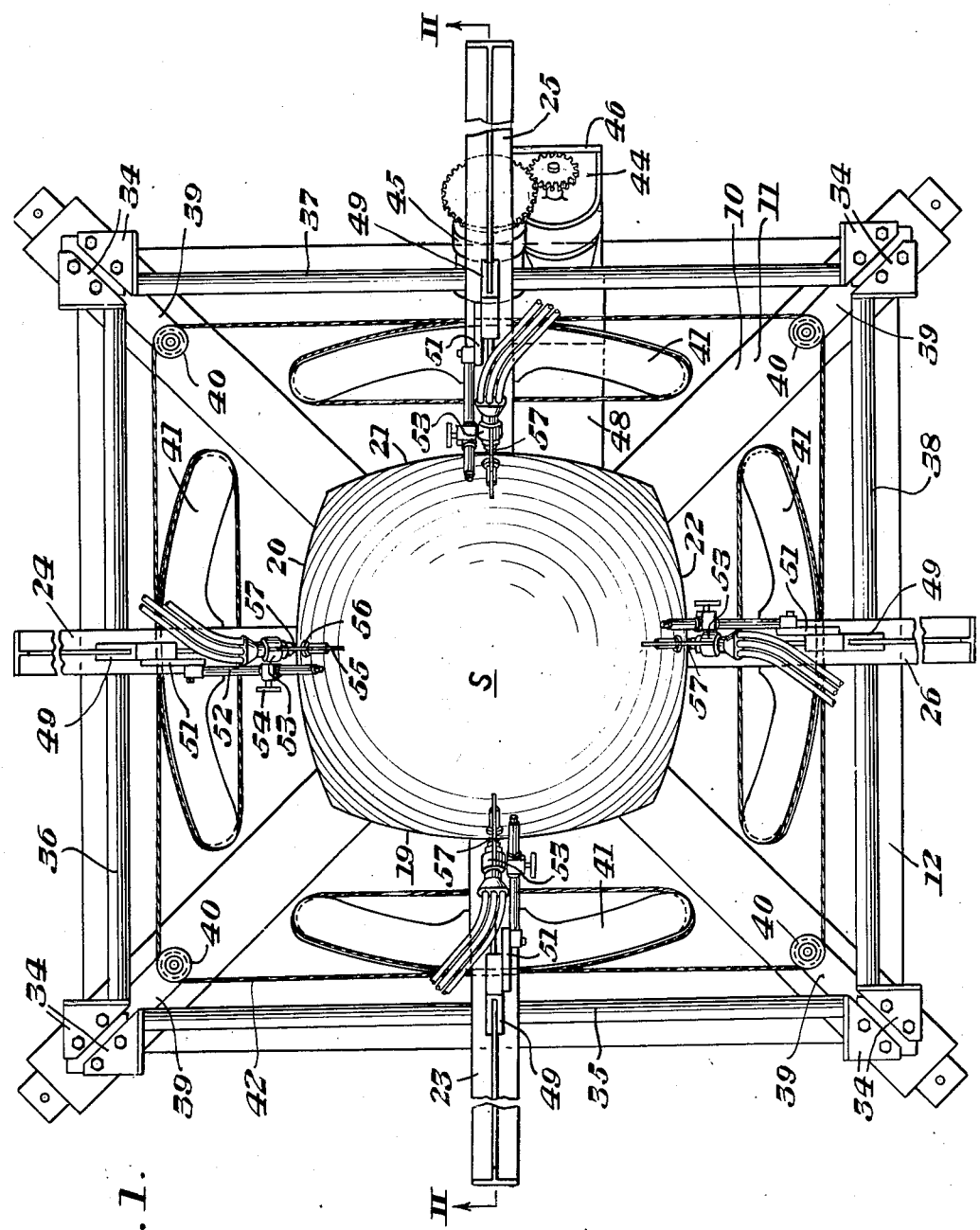
Figure 2:
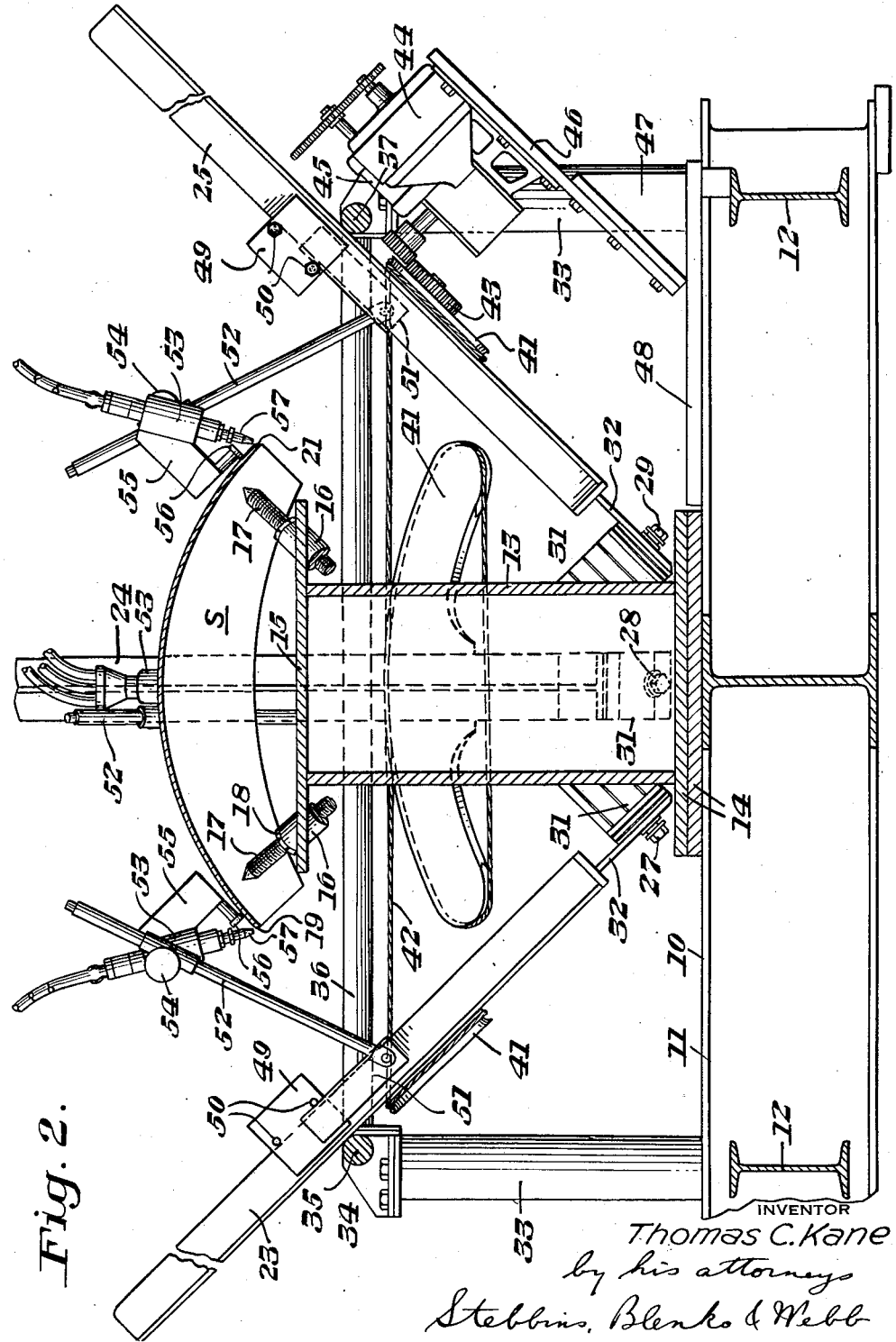

A complete understanding of the invention may be obtained from the following detailed description of the preferred embodiment by reference to the accompanying drawings. In the drawings, Figure 1 is a plan view of the apparatus of my invention; and Figure 2 is a vertical central section taken along the plane of line II—II of Figure 1.

Referring in detail to the drawings, a base 10 is composed of intersecting I-beams 11 and braces 12. A pedestal 13 of square section rests on plates 14 disposed on the base and is provided with a top plate 15. Bushings 16 are spaced in a circle on the plate 15 and welded in holes therethrough at an angle to the plane of the plate. Threaded pins 17 are adjustable longitudinally in the bushings by nuts 18. The pins are pointed at their outer ends to support a spherical stamping S thereon. The bushings 16 are so related angularly that the pins are normal to the surface of the stamping at the point of contact. In other words, the pins are radial relative to the spherical segment and their axes intersect on the center of curvature thereof.

The drawings show the segment S after it has been trimmed to final shape and size by means to be described shortly. It will be understood, of course, that before trimming, the stamping has surplus metal around the finished edges thereof and has a shape depending on that of the starting piece of stock, which is usually square. In order to make possible the assembly of six segments to form a perfect sphere, each segment must be trimmed along the traces or intersections therewith of the four planes passing through the center of the sphere with a dihedral angle of 90° between opposite planes and a dihedral angle of 120° between adjacent planes. In other words, the finished edges 19, 20, 21 and 22 of the segment are arcs on the surface of the sphere, about 70½° in length and at angles of 120° to each other at the points of intersection. These edges define the planes through the center of the sphere, along the traces of which on the segment, the trimming must be effected.

Radius arms 23, 24, 25 and 26 are pivoted on pins 27, 28, 29 and 30 (the last-mentioned of which does not appear in the drawings) for back and forth swinging movement in these planes. The pivot pins 27, 28, 29 and 30 are normal to the planes defined by the edges 21, 22, 19 and 20 of the segment S, respectively. The pins may conveniently be threaded into angle blocks 31 welded to the sides of the pedestal 13. The arms 23, 34, 25 and 26, as illustrated, are of T-section, having a flat piece 32 extending from the lower end for coöperation with the pivot pins.

Posts 33 are located at the four corners of the frame 10 and have angle brackets 34 secured thereto. Guide bars 35, 36, 37 and 38 extend between the corner brackets of adjacent posts and slidingly support the arms 23, 24, 25 and 26 for guided angular movement in planes normal to the pivot pins 27, 28, 29 and 30 or parallel to the planes defined by edges 19, 20, 21, 22 of segment S. As shown in the drawings, opposed flanges of the members of T-section forming the arms rest on the guide bars while the central angularly related flange extends upwardly. A bar 39 extends inwardly from each post 33 and has a pulley 40 journaled thereon. Each of the arms 23, 24, 25 and 26 has a sheave 41 of elongated kidney shape secured thereto. A cable 42 is trained around the sheaves 41 and the pulleys 40 so that movement of the cable in one direction or the other causes corresponding and simultaneous movement of all the arms along the guide bars. The sheave 41 secured to the arm 25 has a segmental gear 43 secured thereon driven by a motor 44 through a gear reducer 45. The motor and gear reducer are mounted on a plate 46 secured to the base by an angle bracket 47 including a bottom plate 48.

Slide blocks 49 are slotted to accommodate the central flange of the arms 23, 24, 25 and 26 and are provided with clamping screws 50 whereby they may be secured in any selected position along the length of the arms. Each block has a bar 51 extending downwardly therefrom. A rod 52 is pivoted to each bar 51 on an axis normal to the length of the arm. A tool holder 53 is mounted on each rod 52 for adjustment therealong, the position of the holder being fixed by a wheel 54. The rod has rack teeth thereon for meshing engagement by a pinion operated by the wheel 54. A bracket 55 extending from each tool holder provides a bearing for a guide roller 56 adapted to engage the surface of the stamping and travel thereover.

A cutting tool 57 is mounted in each holder. In the embodiment illustrated, the tool is of the fusion cutting type, specifically a torch for producing an oxy-acetylene flame or the like, although an arc cutting torch could be used as well.

For simplicity of illustration, the arms 23, 24, 25 and 26 have been shown in centralized position between the posts 33. When it is desired to start a cutting operation, the arms are moved toward one extreme or the other of their back and forth swinging movement. The rods 52 are swung away from the pedestal to permit the stamping to be positioned on the pins 17. Thereafter, the rods 52 are swung back until the rollers 56 rest on the stamping. The motor 44 is then driven to actuate the several arms simultaneously from one extreme position to the other through the medium of the cable 42. The rate of travel of the arms is so adjusted that the cutting tool may effect the desired trimming of surplus metal from the stamping, leaving a smooth true edge. It will be understood from the foregoing description that the construction is such as to insure the trimming of the segment to the proper size and shape on swinging movement of the arms carrying the cutting torches. In other words, the geometry of the apparatus is such as to insure the production of segments trimmed to the desired size and shape. When the trimming has been completed, the rods 52 are again swung outwardly to permit the finished segment to be lifted from the pedestal. It will be understood that the rollers 56 maintain proper relation of the cutting torch to the surface of the segment despite any minor irregularities therein.

The apparatus may be adjusted for various sizes of segments by varying the setting of the pins 17 and by moving the slide blocks 49 along the radius arms.

The advantages of the machine of my invention are evident. In the first place, the four edges of the segment are trimmed simultaneously in a single operation. In the second place, the quality of the product obtained is much superior to that of hand cutting in respect to accuracy, smooth, even edges and the like. The cost of producing the segments is materially reduced by the use of the apparatus since the time required for trimming a segment is only a fraction of that required by the hand operation. The apparatus requires no great skill for its operation but insures that the segments will be trimmed accurately and uniformly.

Although I have illustrated and described but a preferred embodiment of the invention, changes in the construction illustrated may be made without departing from the spirit of the invention or the scope of the appended claims.

I claim:

1. Apparatus for trimming a spherically-curved workpiece, comprising a pedestal, a support for a spherically-curved workpiece so that its center of curvature is at a fixed point relative to the pedestal, four arms pivotally mounted on the pedestal with their pivotal axes passing through said point, said axes being respectively perpendicular to four planes defining a regular pyramid having dihedral angles of 90° between its opposite sides and 120° between its adjacent sides and having its apex at said point, cutters carried by said arms to swing with the respective arms and cut the workpiece where it is intersected by the said four planes, thereby forming a quadrilateral spherical segment capable of being joined with five other identical segments to form a complete sphere, and means connecting all of the arms together so that opposite arms swing oppositely and all of the cutters simultaneously begin and simultaneously complete their cutting strokes at different corners of the quadrilateral segment.

2. Apparatus for trimming a spherically-curved workpiece, comprising a pedestal, a support for a spherically-curved workpiece so that its center of curvature is at a fixed point relative to the pedestal, four arms pivotally mounted on the pedestal with their pivotal axes passing through said point, said axes being respectively perpendicular to four planes defining a regular pyramid having dihedral angles of 90° between its opposite sides and 120° between its adjacent sides and having its apex at said point, cutters carried by said arms to swing with the respective arms and cut the workpiece where it is intersected by the said four planes, thereby forming a quadrilateral spherical segment capable of being joined with five other identical segments to form a complete sphere, and means connecting all of the arms together so that opposite arms swing oppositely and all of the cutters simultaneously begin and simultaneously complete their cutting strokes at different corners of the quadrilateral segment, said means comprising a cable, four pulleys journaled on fixed mountings aligned with the four corners of the quadrilateral segment to be cut, and arced members secured to the respective arms and centered on the respective axes thereof, said cable extending around said pulleys and to and around said arced members, whereby uniform movement of the cable causes the cutters to move at a uniform rate along the workpiece.

3. Apparatus for trimming a spherically-curved workpiece, comprising a pedestal, a support for a spherically-curved workpiece having its concave side facing downwardly, said support being adjustable so that the center of curvature of the workpiece is at a fixed point relative to the pedestal, four arms pivotally mounted on the pedestal with their pivotal axes passing through said point, said axes being respectively perpendicular to four planes defining a regular pyramid having dihedral angles of 90° between its opposite sides and 120° between its adjacent sides and having its apex at said point, said arms slanting upwardly to straddle the workpiece, elements rigidly securable to the respective arms and adjustable longitudinally thereof to allow for differences of radii of different workpieces, and cutters mounted on said elements to swing with the respective arms and cut the workpiece where it is intersected by the said four planes, thereby forming a quadrilateral spherical segment capable of being joined with five other identical segments to form a complete sphere.

4. Apparatus for trimming a spherically-curved workpiece, comprising a pedestal, a support for a spherically-curved workpiece having its concave side facing downwardly, said support being adjustable so that the center of curvature of the workpiece is at a fixed point relative to the pedestal, four arms pivotally mounted on the pedestal with their pivotal axes passing through said point, said axes being respectively perpendicular to four planes defining a regular pyramid having dihedral angles of 90° between its opposite sides and 120° between its adjacent sides and having its apex at said point, said arms slanting upwardly to straddle the workpiece, elements rigidly securable to the respective arms and adjustable longitudinally thereof to allow for differences of radii of different workpieces, fixed guide rails in sliding supporting engagement with the respective arms adjacent the portions thereof secured to the said elements, and cutters mounted on said elements to swing with the respective arms and cut the workpiece where it is intersected by the said four planes, thereby forming a quadrilateral spherical segment capable of being joined with five other identical segments to form a complete sphere.

5. Apparatus for trimming a spherically-curved workpiece, comprising a pedestal, a support for a spherically-curved workpiece having its concave side facing downwardly, said support being adjustable so that the center of curvature of the workpiece is at a fixed point relative to the pedestal, four arms pivotally mounted on the pedestal with their pivotal axes passing through said point, said axes being respectively perpendicular to four planes defining a regular pyramid having dihedral angles of 90° between its opposite sides and 120° between its adjacent sides and having its apex at said point, said arms slanting upwardly to straddle the workpiece, elements rigidly securable to the respective arms and adjustable longitudinally thereof to allow for differences of radii of different workpieces, fixed guide rails in sliding supporting engagement with the respective arms adjacent the portions thereof secured to the said elements, cutters mounted on said elements to swing with the respective arms and cut the work-piece where it is intersected by the said four planes, thereby forming a quadrilateral spherical segment capable of being joined with five other identical segments to form a complete sphere, four pulleys disposed outwardly from the four corners of the segment to be cut and in the planes of movement of adjacent arms, and an endless cable around the pulleys and connected to the arms to swing opposite arms oppositely and to cause all of the cutters simultaneously to begin and simultaneously to complete their cutting strokes at different corners of the quadrilateral segment.

6. Apparatus for trimming a spherically-curved workpiece, comprising a pedestal, supporting means for a spherically-curved workpiece having its concave side facing downwardly, said means being mounted on the pedestal to extend upwardly therefrom to engage the concave undersurface of such workpiece and to position the workpiece with its center of curvature at a predetermined fixed point relative to the pedestal, a plurality of arms pivotally mounted on the pedestal with their pivotal axes passing through said point, said axes being respectively perpendicular to a corresponding number of planes defining sides of a pyramid having its apex at said point, said arms slanting upwardly to straddle the workpiece, supporting and guide means for said arms disposed outside of the projection of such workpiece from said fixed point, connecting elements rigidly securable to the respective arms and pivotable toward the projecting ends of said arms to permit placing such workpiece down on and lifting such workpiece up from said supporting means, and cutters mounted on said elements to swing with the respective arms and to cut the workpiece where it is intersected by the said planes.

7. Apparatus for trimming a spherically-curved workpiece, comprising a pedestal, supporting means for a spherically-curved workpiece having its concave side facing downwardly, said means being mounted on the pedestal to extend upwardly therefrom to engage the concave undersurface of such workpiece, and said means being adjustably mounted to move in directions generally radially of the workpiece, whereby the position of the workpiece is adjustable until its center of curvature is at a predetermined fixed point relative to the pedestal, a plurality of arms pivotally mounted on the pedestal with their pivotal axes passing through said point, said axes being respectively perpendicular to a corresponding number of planes defining a pyramid having its apex at said point, said arms slanting upwardly to straddle the workpiece, supporting and guide means for said arms disposed outside of the projection of such workpiece from said fixed point, connecting elements rigidly securable to the respective arms and adjustable longitudinally thereof to allow for differences of radii of different workpieces, said elements being pivotable toward the projecting ends of said arms to permit placing such workpiece down on and lifting such workpiece up from said supporting means, and cutters mounted on said elements to swing with the respective arms and to cut the workpiece where it is intersected by the said planes.

THOMAS C. KANE.

REFERENCES CITED

The following references are of record in the file of this patent:

UNITED STATES PATENTS

| Number | Name | Date |
|---|---|---|
| 186,704 | Arbey | Jan. 30, 1877 |
| 1,470,168 | Jepsen | Oct. 9, 1923 |
| 1,782,237 | King | Nov. 18, 1930 |
| 2,026,109 | Walters | Dec. 31, 1935 |
| 2,182,707 | Shipman | Dec. 5, 1939 |
| 2,345,104 | Dittrich | Mar. 28, 1944 |
| 2,363,007 | Kohlhafer et al. | Nov. 21, 1944 |
| 2,474,149 | Hume | June 21, 1949 |

FOREIGN PATENTS

| Number | Country | Date |
|---|---|---|
| 122,285 | Austria | Apr. 10, 1931 |
| 176,750 | Great Britain | Sept. 7, 1922 |
| 377,248 | Germany | June 13, 1923 |